United States Patent [19]

Mertens

[11] Patent Number: 5,776,591
[45] Date of Patent: Jul. 7, 1998

[54] ELONGATE PRINTABLE SHEET COMPOSITE

[75] Inventor: Timothy A. Mertens, Woodbury, Minn.

[73] Assignee: Minnesota Mining and Manufacturing Company, St. Paul, Minn.

[21] Appl. No.: 565,422

[22] Filed: Nov. 30, 1995

Related U.S. Application Data

[60] Provisional application No. 60/001,290, Jul. 20, 1995.

[51] Int. Cl.$^6$ ........................................ B32B 3/00
[52] U.S. Cl. ........................... 428/195; 428/40.1; 428/43; 428/126; 428/198; 428/202; 283/105; 283/106
[58] Field of Search .................. 400/118.2; 101/483; 428/411, 174, 195, 192, 913, 409, 914, 40.1, 43, 126, 198, 202; 283/103, 106

[56] References Cited

U.S. PATENT DOCUMENTS

| Re. 33,616 | 6/1991 | Welsch | 428/41 |
|---|---|---|---|
| 4,768,810 | 9/1988 | Mertens | 282/12 A |
| 4,781,306 | 11/1988 | Smith | 221/33 |
| 5,318,825 | 6/1994 | Naber | 428/192 |
| 5,336,541 | 8/1994 | Kobayashi | 428/40 |
| 5,382,055 | 1/1995 | Mertens et al. | 283/67 |
| 5,575,574 | 11/1996 | Mertens | 400/118.2 |

FOREIGN PATENT DOCUMENTS

0250124B1  5/1990  European Pat. Off. .

OTHER PUBLICATIONS

International Search Report for PCT/US96/08889.

*Primary Examiner*—William Krynski
*Attorney, Agent, or Firm*—William L. Huebsch; Carolyn V. Peters

[57] ABSTRACT

A method for forming a custom printed sheet bearing a layer of adhesive using a printer that drives a sheet along a sharply arcuate path past printing head means on the printer. An elongate sheet composite is provided that includes an elongate primary sheet portion of a width adapted to be received and fed through the printer, and a secondary sheet portion positioned adjacent the primary sheet portion with edges of the primary and secondary sheet portions generally aligned; and a layer of pressure sensitive adhesive extending between the adjacent surfaces of the sheet portions. The sheet composite has transverse paths of weakness at spaced locations along its length to define a concatenation of sheet composite segments. The sheet composite is folded in opposite directions along successive transverse paths of weakness to form a stack of sheet composite segments. The sheet composite is fed from the stack longitudinally through the printer while the printer is actuated to form a desired message along a portion of the sheet composite, after which the printed portion of the sheet composite can be torn off, and its first and second portions separated to expose the layer of adhesive so that the message bearing portion of the sheet composite can be adhered to a substrate.

6 Claims, 2 Drawing Sheets

ELONGATE PRINTABLE SHEET COMPOSITE

CROSS-REFERENCE TO RELATED APPLICATION

This application claims priority to U.S. Provisional Pat. Application No. 60/001,290, filed Jul. 20, 1995, now abandoned.

FIELD OF THE INVENTION

The present invention relates to composite materials including a sheet adapted to be printed with indicia and a layer of pressure sensitive adhesive by which the sheet can be adhered to a substrate, and to methods for printing indicia on such sheets.

BACKGROUND OF THE INVENTION

Well known are composite materials or notes each comprising a paper sheet and having a narrow strip of low-peel pressure-sensitive adhesive on one surface adjacent one edge by which the sheet can be temporarily adhered to a substrate such as a document for marking, message-bearing, or other purposes. Pads of such notes are currently being marketed under the trademark "Post-it" brand notes by Minnesota Mining and Manufacturing Company, St. Paul, MN. Such notes have been printed with indicia (e.g., a message, picture, or decoration), by printing with a commercial printing press on large sheets of material from which the notes are formed.

A sheet assembly including paper sheets to which are adhered layers of adhesive and a method for custom printing the sheet assembly and assembling it into pads of notes using a copy machine is described in U.S. patent application Ser. No. 07/973,039 filed Nov. 9, 1992, (the entire content whereof is hereby incorporated herein by reference). The sheet assembly described in that application can be printed in printers of the type commonly used with personal or other types of computers including laser printers, ink jet printers and impact printers.

U.S. patent application Ser. No. 08/223,778 filed Apr. 6, 1994, (the entire content whereof is hereby incorporated herein by reference) describes a sheet composite comprising a sheet coated with pressure sensitive adhesive that is particularly adapted to be printed on one or both sides in printers of the type commonly used with personal or other types of computers including laser printers, ink jet printers and impact printers. Generally, that sheet composite comprises(1) a primary sheet portion having opposite first and second major surfaces of a size adapted to be received by the printers and having first and second opposite edges; (2) a secondary sheet portion having first and second opposite major surfaces and having first and second opposite edges, which secondary sheet portion has a width between its first and second edges that is no more than half the width of the primary sheet portion between its first and second opposite edges; and (3) a layer of pressure sensitive adhesive that is firmly adhered on the first surface of one of the sheet portions along its first edge.

Applicant has recognized a need to provide a sheet generally of the type described in U.S. patent application No. 08/223,778 that is elongate, has a coating of adhesive on one side, and can be printed in an impact printer of a type that was designed to print on an elongate sheet that is wound on a roll with a small inner diameter, and has sheet feeding means defining a sharply arcuate path for driving the sheet longitudinally past a printing head on the printer (e.g., the impact printer commercially designated "Model SP300" that is available from Star Micronics Co., Ltd., Japan). None of the sheet composites described and illustrated in U.S. patent application Ser. No. 08/223,778 is fully adapted for that purpose.

Disclosure of Invention

The present invention provides an elongate sheet composite generally of the type described in U.S. patent application No. 08/223,778 that has a coating of adhesive on one side and is well adapted to be printed in a printer having sheet feeding means defining a sharply arcuate path for driving the sheet composite longitudinally past a printing head on the printer.

Generally, the sheet composite according to the present invention comprises an elongate primary sheet portion having first and second major surfaces of a width between longitudinally extending first and second edges adapted to be received and fed longitudinally through the printer by the sheet feeding means of the printer; a secondary sheet portion having first and second opposite major surfaces of a width between first and second edges that is no more than the width of the primary sheet portion and is preferably less than half its width. The first surface of the secondary sheet portion is positioned adjacent the first surface of the primary sheet portion with the first edges of the primary and secondary sheet portions generally aligned; and a layer of pressure sensitive adhesive extends between the adjacent first surfaces of the sheet portions. That layer of adhesive is firmly adhered on the first surface of one of the sheet portions and is releasably adhered on the first surface of the other of the sheet portions. The sheet composite has transverse paths of weakness at spaced locations along its length to define a concatenation of sheet composite segments therebetween. The sheet composite is folded in opposite directions along successive transverse paths of weakness to form a stack of sheet composite segments alternately disposed with parts of the primary sheet portion adjacent and parts of the secondary sheet portion adjacent. The sheet composite can be fed from that stack longitudinally into the sheet feeding means of the printer. A length of the sheet composite can be printed by the printer and separated from the non printed portion of the sheet composite. The layer of pressure sensitive adhesive on that printed length can then be exposed by pealing the secondary sheet portion away from it, and that layer of adhesive can be used to adhere the separated printed length to a substrate to which the printing on the separated length refers or relates.

Providing an elongate sheet composite including such a stack of sheet composite segments allows compact storage of the sheet composite without rolling it into a roll. Rolling the elongate sheet composite into a roll having a small inner diameter is not an acceptable form of storage because such rolling can cause wrinkling and/or breaking of the sheet.

The sheet composite segments can be made various lengths in a range of about two to twelve inches to suit different needs, with sheet composite segments of about four to seven inches in length being preferred.

To facilitate smooth feeding of the sheet composite through the sharply arcuate path in the printer, its secondary sheet portion can be cut between the first and second edges of the secondary sheet portion at spaced locations along the length of the sheet composite, preferably including at the transverse paths of weakness and, if needed, between the transverse paths of weakness. To provide the desired effect, the secondary sheet portion should be cut at least every twelve inches with cuts about every six inches being more effective and cuts about every three inches being even more effective.

While they could be separate, preferably, the primary and secondary sheet portions are two portions of a single sheet which is bent along the first edges of the sheet portions to position the first surface of the secondary sheet portion adjacent the first surface of the primary sheet portion. Such bending can be facilitated by a path of weakness (e.g., perforations) between the primary and secondary sheet portions.

Also, preferably, the layer of adhesive is firmly adhered on the first surface of the primary sheet portion.

The primary and/or the secondary sheet portions could be pre-printed with indicia that could, for example, include the trademark of the establishment printing the sheet composite, advertising material, or coupons that could be torn from the sheet composite after it is printed and delivered to a customer.

A method according to the present invention for forming a custom printed sheet bearing a layer of adhesive using an impact printer comprising printing head means, and sheet feeding means defining a sharply arcuate path for driving the sheet composite longitudinally past printing head means on the printer comprises the steps of (1) providing the elongate sheet composite described above; (2) actuating the printer to form a desired message; (3) feeding the sheet composite from the stack longitudinally through the printer so that the message is printed along a portion of the sheet composite; (4) separating the printed portion of the sheet composite from the non printed portion of the sheet composite; and (5) separating the first surface of the secondary sheet portion from the first surface of the primary sheet portion so that the layer of pressure sensitive adhesive is exposed and the printed sheet composite can be adhered to a substrate by that layer of adhesive.

The sheet can be of any conventional material (e.g., conventional bond, or clay-coated paper, opaque or translucent polymeric material, or carbonless paper). For some applications the adhesive used in the layers of pressure-sensitive adhesive could be a low-peel pressure-sensitive adhesive (e.g., comprising tacky, elastomeric copolymer microspheres) and the opposing surface could be free of release coating. Where the printed portion of the sheet is to be permanently adhered to the substrate the adhesive should be an aggressive pressure-sensitive adhesive and the sheet composite can include a release coating where the adhesive is temporarily adhered to it. Suitable release materials for such aggressive adhesives may be selected from acrylates, urethanes, silicones, fluropolymers, chrome complexes, and the like that are known in the art.

BRIEF DESCRIPTION OF THE DRAWINGS

The present invention will be further described with reference to the accompanying drawing wherein like reference numerals refer to like parts in the several views, and wherein.

DETAILED DESCRIPTION

Figure 3:
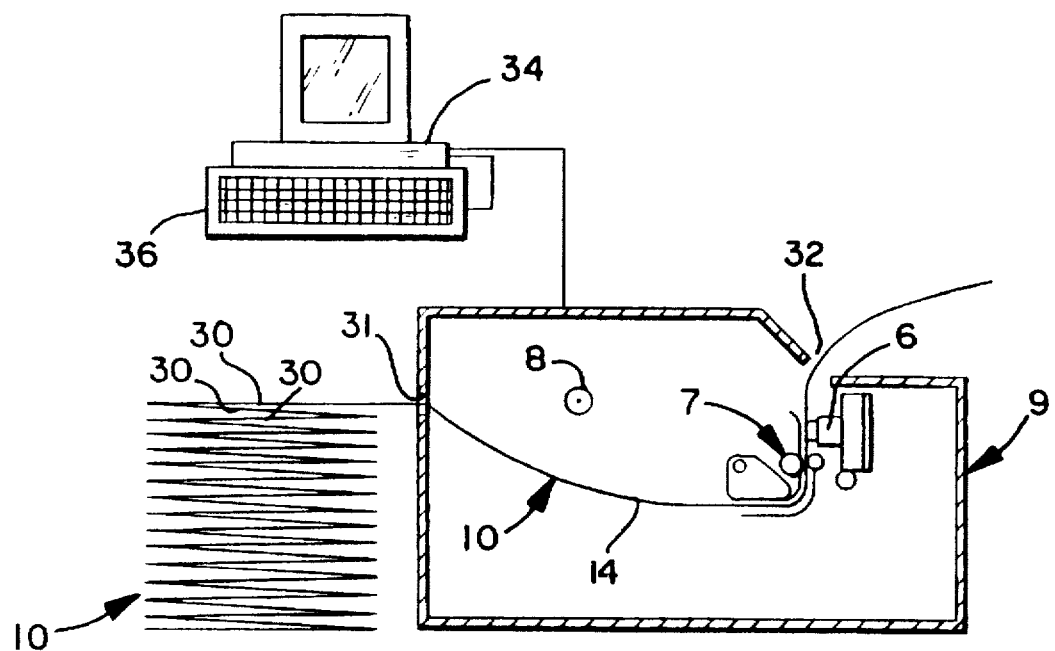
FIG. 3 is a schematic view of the sheet composite of FIG. 1 being fed through and printed on by a printer controlled by a computer, with the printer being partially sectioned to show a drive mechanism and printing head means in the printer.

Referring now to the drawing, there is illustrated a sheet composite according to the present invention generally designated by the reference numeral 10. The sheet composite 10 is elongate and is adapted to be printed in an impact printer 9 (FIG. 3) that was designed to print on an elongate sheet wound on a roll with a small inner diameter supported on a spindle 8 in the printer 9, which printer 9 has sheet feeding means 7 defining a sharply arcuate path for driving the sheet composite 10 longitudinally past printing head means 6 on the printer 9 (e.g., the impact printer commercially designated "Model SP300" that is available from Star Micronics Co., Ltd., Japan).

Figure 1:
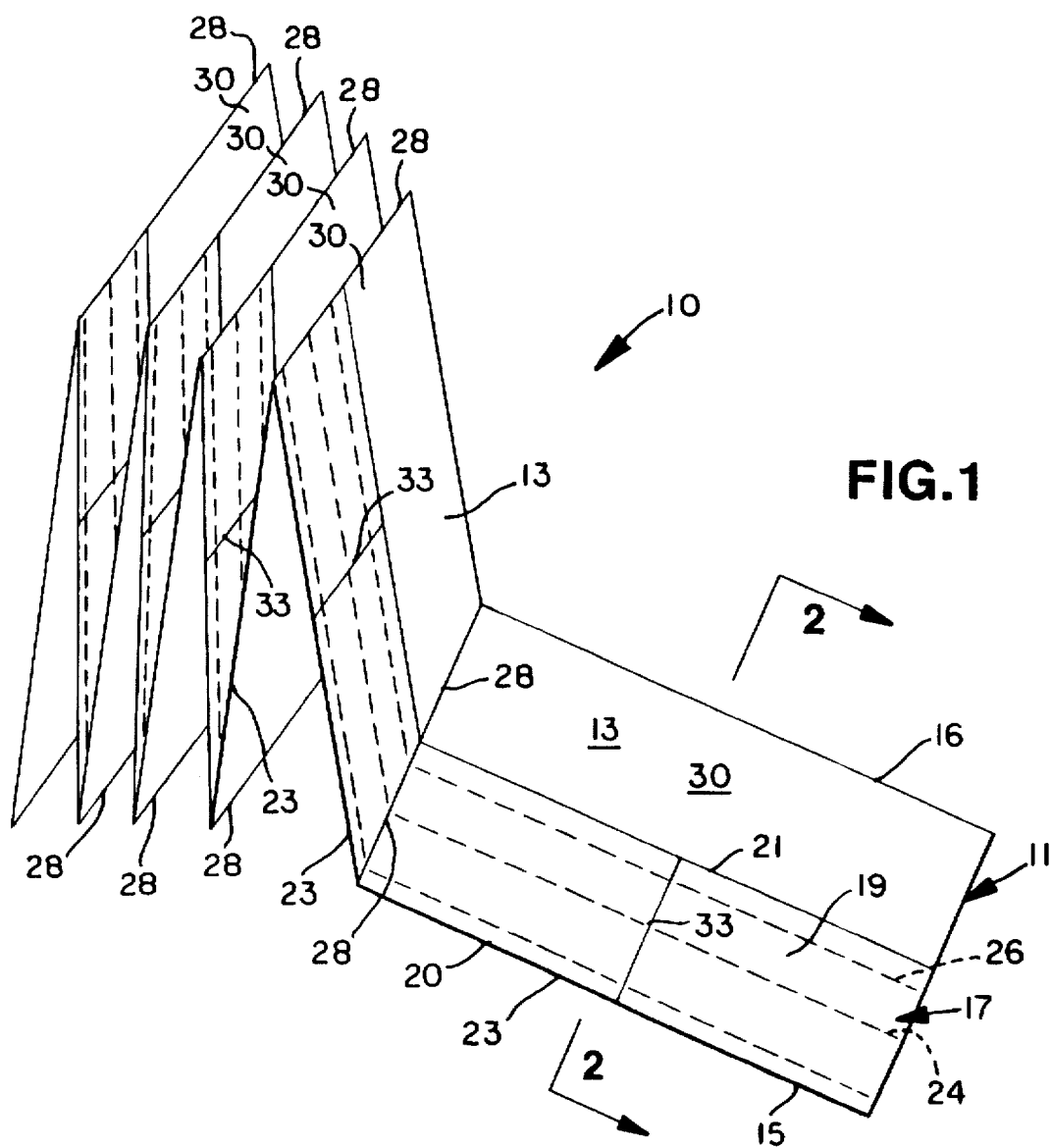
FIG. 1 is a perspective view of a sheet composite according to the present invention.
Figure 2:
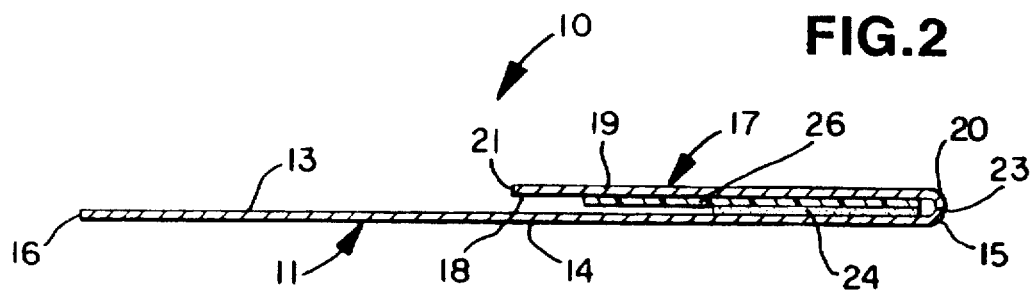
FIG. 2 is an enlarged sectional view taken approximately along lines 2—2 of FIG. 1.

The sheet composite 10 comprises an elongate primary sheet portion 11 (FIGS. 1 and 2) having opposite longitudinally extending first and second edges 15 and 16, and first and second major surfaces 13 and 14 having a width between those edges 15 and 16 adapted to be received and fed through the printer 9 by the sheet feeding means 7 of the printer 9. Also included in the sheet composite 10 is a secondary sheet portion 17 having first and second opposite major surfaces 18 and 19 and having first and second opposite edges 20 and 21. The secondary sheet portion 17 has a width between its first and second edges 20 and 21 that is no more than (and preferably less than half) the width of the primary sheet portion 11 between its first and second opposite edges 15 and 16. The first surface 18 of the secondary sheet portion 17 is positioned adjacent the first surface 13 of the primary sheet portion 11 with the first edges 15 and 20 of the primary and secondary sheet portions 11 and 17 generally aligned. A layer 24 of high tack pressure sensitive adhesive extends between the adjacent first surfaces 13 and 18 of the sheet portions 11 and 14. The layer 24 of adhesive is firmly adhered on the first surface 13 of the primary sheet portion 11 and is releasably adhered on the first surface 18 of the secondary sheet portion 17 which is coated with a layer 26 of release material.

Alternatively, the layer 24 of adhesive could be firmly adhered on the first surface 18 of the secondary sheet portion 17 and could be releasably adhered on the first surface 13 of the primary sheet portion 11 which could be coated with a layer of release material, and/or the layer of adhesive could be a repositionable adhesive and no layer of release material may be needed. Also, alternatively, the sheet composite could include two layers of pressure sensitive adhesive extending between the adjacent first surfaces of the primary and secondary sheet portions, with the adhesive of one of those layers being firmly adhered on the first surface of the primary sheet portion and being releasably adhered on the first surface of the secondary sheet portion, and with the adhesive of the other of the layers being firmly adhered on the first surface of the secondary sheet portion and being releasably adhered on the first surface of the primary sheet portion.

Figure 4:
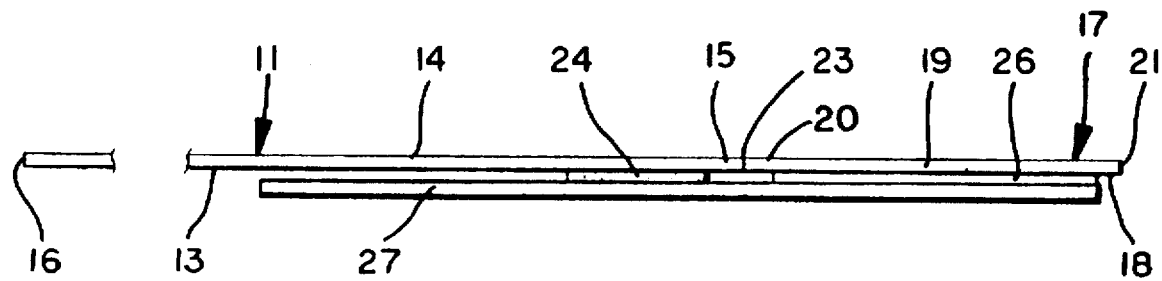
FIG. 4 is an enlarged fragmentary edge view of a part of the sheet composite of FIG. 1 removed and adhered to a substrate.

As illustrated, the primary and secondary sheet portions 11 and 17 are made from one sheet of material (e.g., paper) that is perforated (e.g., microperforated) along the first edges 15 and 20 so that they are joined with the first surfaces 13 and 18 of the sheet portions on corresponding sides of the sheet, and so that the perforations provide a linear path of weakness 23 about which the sheet is bent. The parts of the sheet between the perforations along the first edges 15 and 20 provide sufficient integrity so that the sheet does not separate along that path of weakness 23 while being printed. The sheet can be bent about that path of weakness 23 to an open position (FIG. 4) with the first surfaces 13 and 18 of the sheet portions 11 and 17 generally in the same plane and exposing the layer 24 of adhesive so that the sheet can be adhered to a substrate 27 by the layer 24 of adhesive.

The primary sheet portion 11 is perforated (e.g., microperforated) and the secondary sheet portion 17 is cut between its edges 20 and 21 to provide transverse paths of weakness 28 for the sheet composite 10 between and at right angles to the first and second edges 15,16;20,21 at spaced locations along the length of the sheet composite 10. The transverse paths of weakness 28 define a concatenation of sheet composite segments 30 therebetween along the length of the sheet composite 10. The sheet composite 10 is folded in opposite directions along successive transverse paths of weakness 28 to form a stack of sheet composite segments 30 alternately disposed with parts of the primary sheet portion 11 adjacent and parts of the secondary sheet portion 17 adjacent. The sheet composite 10 can thus be disposed in a stack by the printer 9 (FIG. 3) and fed from the top of that stack into the sheet feeding means of the printer 9 through a slot 31 in its back wall. After a length of the sheet composite 10 is printed by the printer 9 and separated from the non printed portion of the sheet composite 10 by cutting it against a cutting edge 32 across an outlet slot of the printer 9, the secondary sheet portion 17 can be manually separated from the primary sheet portion 11 to expose the layer of adhesive 24 along the separated printed length and that separated printed length can be firmly adhered on a substrate 27 (FIG. 4) to which the printing on the separated length relates.

The secondary sheet portion 17 also has a transverse cut 33 midway between its transverse cuts at the transverse paths of weakness 28. All of the transverse cuts along the length of secondary sheet portion 17 facilitate smooth movement of the sheet composite 10 around the sharply arcuate path defined by the sheet feeding means 7 in the printer 9 that drives the sheet composite 10 longitudinally past the printing head means 6.

Preferably, the perforations in the primary sheet portion 11 that help to provide the transverse paths of weakness 28 about which the sheet composite 10 is bent leave sufficient strength in the sheet composite 10 so that it can be cut transversely on the printer 9 at any place along its length by pulling on the sheet composite 10 without causing separation along one of the aligned paths of weakness 28 between the point at which the pulling force is applied to the sheet composite 10 and the cutting edge 32 on the printer 9.

As an example, in the fast food business, the printer 9 can be used to print special instructions on the sheet composite 10 concerning food being prepared (e.g., no pickles, extra mustard, or no lettuce), and that printed message can be permanently adhered by the layer 24 of adhesive to a wrapper, package or sack in which the food is moved through the food delivery system.

Typically to form such a message using the printer 9 there is provided a manually operable means (e.g., a computer 34) for forming a message in an electronic form capable of operating the printer 9 in a manner such that the printer 9 will print the message when the printer 9 is actuated and the electronic form of the message is sent to the printer 9; a desired message is formed by a person using the manually operable means (e.g. manually typing the message in at a keyboard 36 associated with the computer 34); the printer 9 is actuated; and the message is sent in its electronic form to the printer 9 (e.g., by actuating the print function of a program in the computer 34).

Example

An example of the sheet composite 10 described above was made using a six inch wide 20 # white bond elongate paper web for the sheet; a premium release silicone for the layer 26 of release material that was a blend of 96 parts by weight Syl-Off® 7676 and 4 parts by weight of Syl-Off® 7678, both commercially available from Dow Corning Corporation; and for the layer 24 of adhesive an aggressive permanent 0.5 inch wide length of transfer adhesive that is commercially available as "Scotch™ 924-100" from Minnesota Mining and Manufacturing Company, St. Paul, MN.

The silicone was coated on the paper sheet by dragging the paper sheet longitudinally under a reservoir containing the silicone and then under a flat bar directly contacting the web to deposit a 1.125 inch wide layer 26 of silicone coated about 0.25 inch from an edge of the paper web that would provide the edge 21 for the sheet composite 10. The layer 26 of silicone was completely cured.

The paper web was then longitudinally perforated using a microperforating wheel to form the line of weakness 23 along its length that was located about 1.5 inches from the edge of the web that would form the edge 21, and was located about 0.125 inch from the adjacent edge of the layer 26 of silicone, thereby forming the secondary sheet portion 17 of the sheet composite 10 between the line of weakness 23 and the edge 21.

The web was then slit to form the edge 16 of the primary sheet portion 11 and provide a total web width of about 4.75 inches.

The web was then perforated in the transverse or cross direction at 6 inch intervals with the microperforating wheel and the secondary sheet portion 17 was manually cut along each cross perforation to form the transverse paths of weakness 28 for the sheet composite. The secondary sheet portion 17 was also cut midway between each cut at the transverse paths of weakness 28. Thus, the sheet composite 10 had a transverse path of weakness every 6 inches, and the secondary sheet portion 17 was cut transversely every 3 inches.

The 0.5 inch wide transfer adhesive was applied longitudinally to the same surface of the web on which the layer 26 of release material was applied at a spacing of about 0.25 inch away from the side of the perforations forming the path of weakness 23 opposite the layer 26 of release material. A liner was removed that covered the transfer adhesive while it was being applied. The web was folded along the perforations forming the path of weakness 23 to adhere the layer 24 of adhesive to the layer 26 of release material, and then the web was transversely fanfolded at the transverse paths of weakness 28 to complete the sheet composite 10.

The resultant sheet composite 10 was printed on the second surface 14 of the primary sheet portion 11 in the impact printer commercially designated "Model SP300" that is available from Star Micronics Co., Ltd., Japan and was found to reliably feed into and through the printer without being torn or wrinkled, and to have clear printing formed on that second surface 14.

The present invention has now been described with reference to one embodiment thereof and to several possible modifications of that embodiment. It will be apparent to those skilled in the art that many additional changes and modifications can be made in the embodiment described without departing from the scope of the present invention. For example, the paths of weakness formed in the sheet composite 10 can be provided in many ways other than perforations that will bind adjacent edges of sheet portions together and allow the sheet portions to be pivoted relative to each other along the paths of weakness while providing sufficient integrity so that the sheet portions do not separate along that line while being printed, and can, if desired be torn apart along the line of weakness. Those ways include weakening a sheet of material by crushing or scoring the sheet, chemical treatments, and the like, and where two sheets are used to form the sheet portions by gluing their adjacent edges together or joining their adjacent edges by a length of adhesive coated tape or the like. Thus, the scope of the present invention should not be limited to the structures and methods described in this application, but only by the structures and method described by the language of the claims and the equivalents thereof.

I claim:

1. In combination, an elongate sheet composite, and an impact printer comprising printing head means, and sheet feeding means defining a sharply arcuate path for driving the sheet composite longitudinally past the printing head means on the printer, said sheet composite comprising:

an elongate primary sheet portion having opposite longitudinally extending first and second edges, and first and second major surfaces between said edges;

a secondary sheet portion having first and second opposite major surfaces and having first and second opposite edges, said secondary sheet portion having a width between said first and second edges that is no more than the width of the primary sheet portion between the first and second opposite edges of the primary sheet portion, the first surface of said secondary sheet portion being positioned adjacent the first surface of the primary sheet portion with the first edges of said primary and secondary sheet portions generally aligned; and a layer of pressure sensitive adhesive extending between the adjacent first surfaces of said sheet portions, said adhesive being firmly adhered on the first surface of one of said sheet portions and being releasably adhered on the first surface of the other of said sheet portions;

said primary and secondary sheet portions having transverse paths of weakness at spaced locations along the length of said sheet composite to define a concatenation of sheet composite segments therebetween, and said sheet composite being folded in opposite directions along successive transverse paths of weakness to form a stack of sheet composite segments alternately disposed with parts of said primary sheet portion adjacent and parts of said secondary sheet portion adjacent;

said sheet composite having a width between the first and second edges of said primary sheet portion adapted to be received and fed through the printer by the sheet feeding means of the printer, said sheet composite being fed from said stack into the sheet feeding means of the printer, and after a length of the sheet composite is printed by the printer and separated from the non printed portion of the sheet composite, the secondary sheet portion being separable from the primary sheet portion along the separated printed length to expose the layer of adhesive, and that separated printed length being adherable on a substrate to which the printing on the separated length relates.

2. A combination according to claim 1 wherein said secondary sheet portion has a cut between the first and second edges of said secondary sheet portion at each of said transverse paths of weakness.

3. A combination according to claim 1 wherein the adhesive in said layer of adhesive is a high tack adhesive and said sheet composite includes a layer of release material on the first surface of the sheet to which said layer of adhesive is releasably adhered.

4. A combination according to claim 1 wherein said primary and secondary sheet portions are two portions of a single sheet, said sheet being bent along said first edges to position the first surface of said secondary sheet portion adjacent the first surface of the primary sheet portion.

5. A combination according to claim 4 wherein said sheet has a path of weakness between said primary and secondary sheet portions, and said layer of adhesive is firmly adhered on the first surface of said primary sheet portion.

6. A combination according to claim 1 wherein said first and second sheet portions are portions of one sheet joined at said first edges of said first and second sheet portions, said one sheet is longitudinally perforated at the juncture between said first and second edges of said primary and secondary sheet portions, and said sheet composite includes two layers of pressure sensitive adhesive extending between the adjacent first surfaces of said sheet portions, with the adhesive of one of said layers being firmly adhered on the first surface of said primary sheet portion and being releasably adhered on the first surface of the secondary sheet portion, and with the adhesive of the other of said layers being firmly adhered on the first surface of said secondary sheet portion and being releasably adhered on the first surface of the primary sheet portion.

* * * * *